(12) United States Patent
Chung et al.

(10) Patent No.: US 11,800,263 B2
(45) Date of Patent: Oct. 24, 2023

(54) METHOD OF BANDWIDTH ALLOCATION FOR TRANSMITTING MOBILE DATA AND NETWORK DEVICE

(71) Applicant: ELECTRONICS AND TELECOMMUNICATIONS RESEARCH INSTITUTE, Daejeon (KR)

(72) Inventors: Hwan Seok Chung, Daejeon (KR); Kyeong Hwan Doo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/741,997

(22) Filed: May 11, 2022

(65) Prior Publication Data

US 2022/0369007 A1   Nov. 17, 2022

(30) Foreign Application Priority Data

May 14, 2021  (KR) .................. 10-2021-0062653
Dec. 17, 2021  (KR) .................. 10-2021-0182056

(51) Int. Cl.
*H04Q 11/00*    (2006.01)
*H04W 72/0446*  (2023.01)
*H04B 10/11*    (2013.01)

(52) U.S. Cl.
CPC ......... *H04Q 11/0062* (2013.01); *H04B 10/11* (2013.01); *H04W 72/0446* (2013.01); *H04Q 2011/0086* (2013.01)

(58) Field of Classification Search
CPC .................................................. H04Q 11/0062
See application file for complete search history.

(56) References Cited

U.S. PATENT DOCUMENTS

| | | | |
|---|---|---|---|
| 2013/0039182 A1* | 2/2013 | Das | H04Q 11/0067 370/235 |
| 2020/0014992 A1 | 1/2020 | Chung et al. | |
| 2020/0214022 A1 | 7/2020 | Harstead et al. | |
| 2020/0351935 A1* | 11/2020 | Chapman | H04W 72/23 |
| 2021/0136790 A1 | 5/2021 | Bidkar et al. | |
| 2021/0160597 A1 | 5/2021 | Doo et al. | |

OTHER PUBLICATIONS

ITU-T Series G Supplement 71, "Optical line termination capabilities for supporting cooperative dynamic bandwidth assignment", Apr. 2021 (Year: 2021).*

Electronics and Telecommunications Research Institute, "5G NR scheduling at RAN time structures for G.sup. CoDBA", International Telecommunication Union, Mar. 29, 2021.

* cited by examiner

*Primary Examiner* — Shi K Li
(74) *Attorney, Agent, or Firm* — LRK PATENT LAW FIRM

(57) ABSTRACT

Provided are a method of bandwidth allocation for transmitting mobile data and a network device. The bandwidth allocation method includes receiving a cooperative transport interface (CTI) message including a traffic pattern corresponding to a CTI pattern identification (ID) from a distributed unit (DU) of a mobile network, and allocating a bandwidth for transmitting mobile data based on the traffic pattern included in the CTI message.

13 Claims, 7 Drawing Sheets

METHOD OF BANDWIDTH ALLOCATION FOR TRANSMITTING MOBILE DATA AND NETWORK DEVICE

CROSS-REFERENCE TO RELATED APPLICATIONS

This application claims the benefit of Korean Patent Application No. 10-2021-0062653 filed on May 14, 2021, and Korean Patent Application No. 10-2021-0182056 filed on Dec. 17, 2021, in the Korean Intellectual Property Office, the entire disclosure of which are incorporated herein by reference for all purposes.

BACKGROUND

1. Field of the Invention

One or more example embodiments relate to a method of bandwidth allocation for transmitting mobile data and a network device, and more particularly propose providing traffic through cooperative transport interface (CTI) for interaction between an optical line terminal (OLT) of a passive optical network (PON) and a mobile distributed unit (DU).

2. Description of Related Art

Recently, a network considering a combination of a mobile network and an optical network has been proposed. In particular, the mobile network rapidly transmits and receives mobile data between a base station and a terminal, and the optical network may be located between the base station and the terminal.

The mobile network requires low latency to provide a mobile service by transmitting mobile data from the base station to the terminal. There is a need for a solution to satisfy the requirement of low latency of the mobile network even in the optical network.

SUMMARY

Example embodiments provide setting a bandwidth through time alignment and traffic pattern exchange between a mobile network (radio access network: RAN) and a passive optical network (PON).

According to an aspect, there is provided a bandwidth allocation method performed by an OLT including receiving a CTI message including a traffic pattern corresponding to a CTI pattern identification (ID) from a DU of a mobile network, and allocating a bandwidth for transmitting mobile data based on a symbol included in the traffic pattern included in the CTI message.

The traffic pattern may be identified through a slot format indicator table including a plurality of traffic components including at least one of an uplink symbol, a downlink symbol, and a flexible symbol.

In the traffic pattern, at least one of the uplink symbol, the downlink symbol, and the flexible symbol may be disposed in a time slot of a predetermined length for each of a plurality of sub frames included in a radio frame.

A length of a slot included in the subframe may be determined differently according to subcarrier spacing.

The number of slots included in the subframe may be determined differently according to subcarrier spacing.

A boundary of the time slot of the traffic pattern is aligned in the RAN network, and radio units (RUs) of the RAN network may process data during the same time slot at the same time.

The DU may be configured to generate a CTI report at a specific time interval for the RU, and the specific time interval may correspond to one or more of the time slots.

According to an aspect, a bandwidth allocation method performed by an OLT according to an example embodiment may include receiving a CTI message including a traffic pattern from a DU of a mobile network, and allocating a bandwidth for transmitting mobile data based on a symbol of a traffic pattern included in the CTI message.

According to an aspect, there is provided an OLT for allocating bandwidth including a processor, and the processor may receive a CTI message including a traffic pattern corresponding to the CTI pattern ID from a DU of the mobile network, and allocate a bandwidth for transmitting mobile data based on symbols included in a traffic pattern included in the CTI message.

The traffic pattern may be identified through a slot format indicator table including a plurality of traffic components including at least one of an uplink symbol, a downlink symbol, and a flexible symbol.

In the traffic pattern, at least one of the uplink symbol, the downlink symbol, and the flexible symbol may be disposed in a time slot of a predetermined length for each of a plurality of sub frames included in a radio frame.

A length of a slot included in the sub frame may be determined differently according to subcarrier spacing.

The number of slots included in the sub frame may be determined differently according to subcarrier spacing.

A boundary of a time slot of the traffic pattern may be aligned in the RAN network, and RUs of the RAN network may process data during the same time slot at the same time.

The DU may be configured to generate a CTI report at a specific time interval for the RU, and the specific time interval may correspond to one or more of the time slots.

Additional aspects of example embodiments will be set forth in part in the description which follows and, in part, will be apparent from the description, or may be learned by practice of the disclosure.

According to example embodiments, it is possible to set a bandwidth through time alignment and traffic pattern exchange between a mobile network (RAN) and an passive optical network (PON).

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
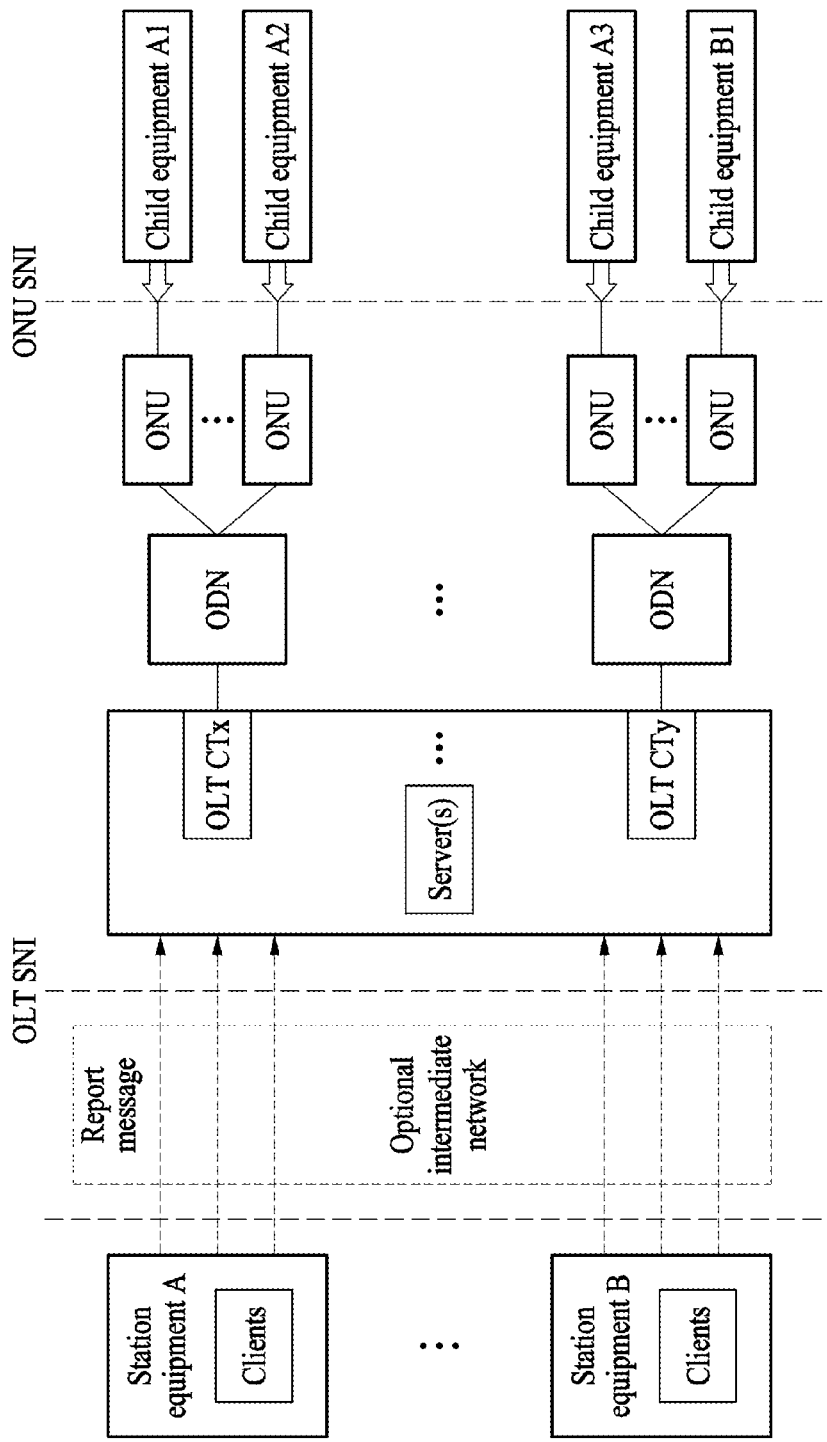
FIG. 1 is a diagram illustrating a process of exchanging information between network devices according to an example embodiment.

Hereinafter, example embodiments will be described in detail with reference to the accompanying drawings. However, the scope of the patent application is not limited by these example embodiments. When describing the example embodiments with reference to the accompanying drawings, like reference numerals refer to like components.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Terms used in an example embodiment are used only to illustrate a specific example embodiment, and are not intended to limit the example embodiment. As used herein, the singular forms "a," "an," and "the" are intended to include the plural forms as well, unless the context clearly indicates otherwise It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like components and a repeated description related thereto will be omitted. In describing example embodiments, when it is determined that a specific description of a related known art may unnecessarily obscure the subject matter of the example embodiments, a detailed description thereof will be omitted.

Hereinafter, example embodiments will be described in detail with reference to the accompanying drawings.

Example embodiments illustrate using cooperative dynamic bandwidth allocation (CO DBA) in an OLT of a PON. A mobile fronthaul using CTI of an open radio access network (O-RAN), which is an interface between the OLT and the mobile DU, is disclosed.

The terms described in the example embodiments are as follows.

A CTI client processes the process of open distributed unit (O-DU) exchanging the CTI message with one or several CTI servers (e.g., to require a given transport capability).

The CTI server processes the process of a transmission node exchanging the CTI message with one or more CTI clients (e.g., to require capacity).

A mobile slot refers to a sub frame in a long-term evolution (LTE), 5G network, or beyond.

A service node interface (SNI) is an interface providing access to a service node.

Dynamic bandwidth allocation (DBA) as described in the example embodiments refers to the process of distributing upstream PON capacity between traffic-bearing entities in an optical network unit (ONU) based on the traffic activity of the OLT and the dynamic indication of the configured traffic contracts.

The CO DBA described in the example embodiments refers to a dynamic bandwidth allocation method based on upstream scheduling information of a transmission level or an application level provided by an external equipment of an OLT such as a mobile network.

<Overview>

When variable bandwidth allocation is applied to conform to a variable bitrate traffic pattern, the CO DBA is a method of reducing upstream latency in the PON. The CO DBA proceeds based on information notification about traffic from other entities (e.g., the DU in case of mobile fronthaul) to the OLT. The OLT may apply a target bandwidth allocation to process a traffic volume based on the information on the mobile traffic at corresponding time interval known in the information.

For the CO DBA between the OLT and other entity, message exchange through a logical interface is required. A CTI protocol may be defined for transmitting the mobile fronthaul through the PON.

The CO DBA depends on a signaling interface of the OLT of the PON, the interpretation and processing of the exchanged notification to the CO DBA, the availability of a common time reference, and several capabilities such as other capabilities.

FIG. 1 is a diagram illustrating a process of exchanging information between network devices according to an example embodiment.

The CO DBAs may provide the capability to balance bandwidth efficiency and waiting time for transmitting upstream traffic through the PON. When using the CO DBA, bandwidth allocation for transmitting data may more closely match the actual traffic (both in volume and timing) since additional information on the traffic to be transmitted later is provided in advance. By pre-allocating a bandwidth, statistical multiplexing may be more useful while keeping latency, which is waiting time, low.

The CO DBA proceeds based on the interaction between the PON transmission system operating as a "client system" and a "server system". The client system may include a station equipment controlling several child equipment in turn or having visibility. The station equipment may transmit a bandwidth report to traffic of the child equipment. The client system may include an integrated equipment that reports on its own traffic requirements.

Referring to FIG. 1, the station equipment including the client may be connected to the OLT through the OLT SNI, and may report on the traffic requirement of the child equipment aggregated in the PON.

Figure 2:
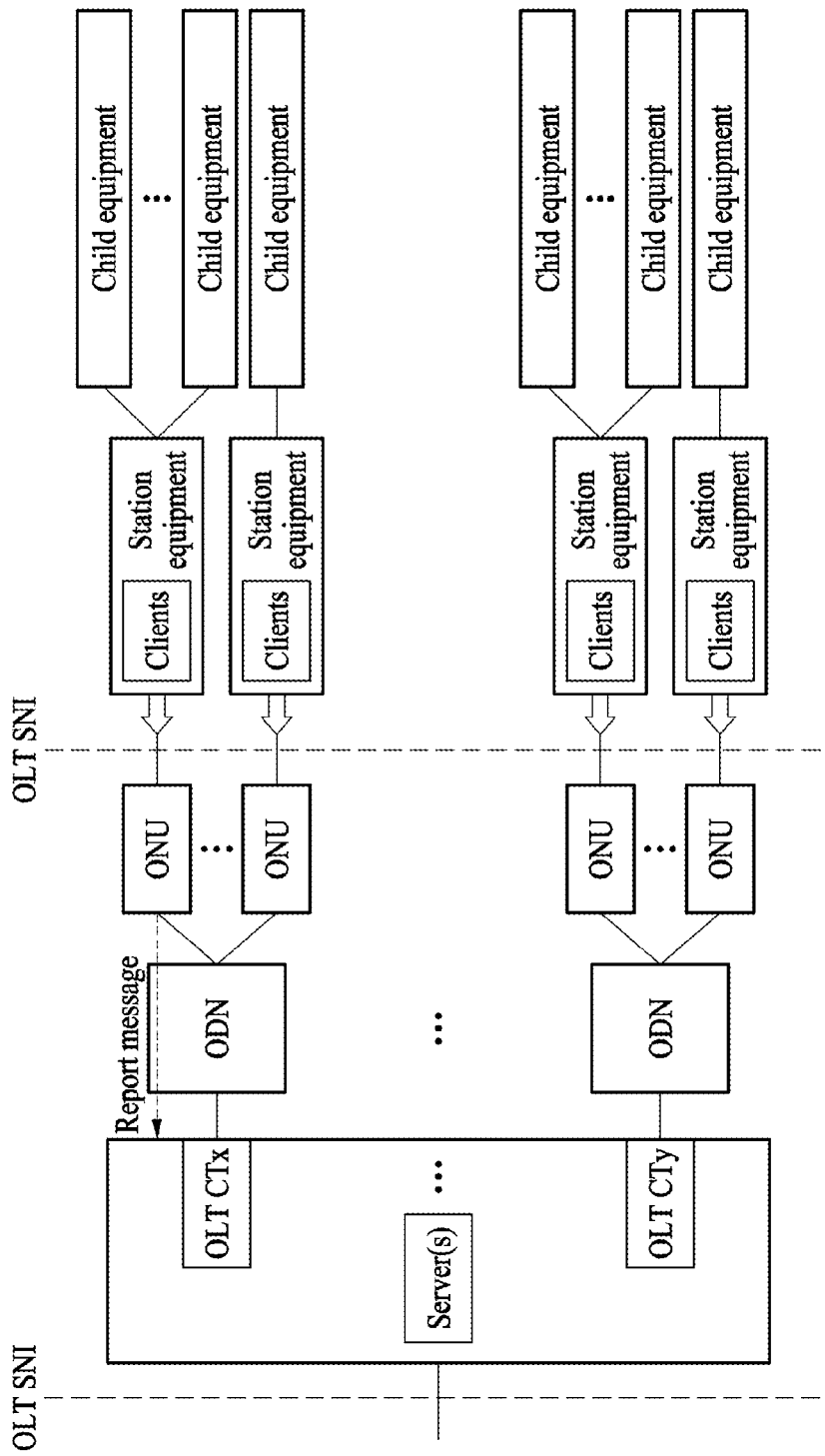
FIG. 2 is a diagram illustrating a process of exchanging information between network devices according to another example embodiment.

FIG. 2 is a diagram illustrating a process of exchanging information between network devices according to another example embodiment.

Referring to FIG. 2, station equipment including the client may be aggregated by the PON network itself, and may be connected to the OLT through the user network interface (UNI) of the ONU. The station equipment may report the traffic requirement. A connection from the ONU to the OLT needs to exist for both the traffic itself and the report information transmitted from the station equipment.

In order for the CO DBA to proceed, the following capability is required in the OLT.

a) Receiving and interpreting information on expected bandwidth for volume and timing indications.

The CO DBA needs to consider the information on the expected bandwidth in order to allocate the bandwidth allocation at appropriate time for an appropriate transmission container (T-CONT). Here, transmission container (T-CONT) is a traffic-bearing entity in the ONU representing a group of logical connections, managed through ONU management and control channel (OMCC) and managed through transmission convergence (TC) layer Alloc-ID. T-CONT is treated as a single entity for upstream bandwidth allocation in the PON.

b) Protocol support for transmitting information on the expected bandwidth from the client system (including a protocol client) to the OLT (including a protocol server).

The protocol defines a message, a message format, and a state diagram.

c) Supporting a method of sharing a common time reference with the client system (the station equipment or the network associated with the station equipment)

Figure 3:
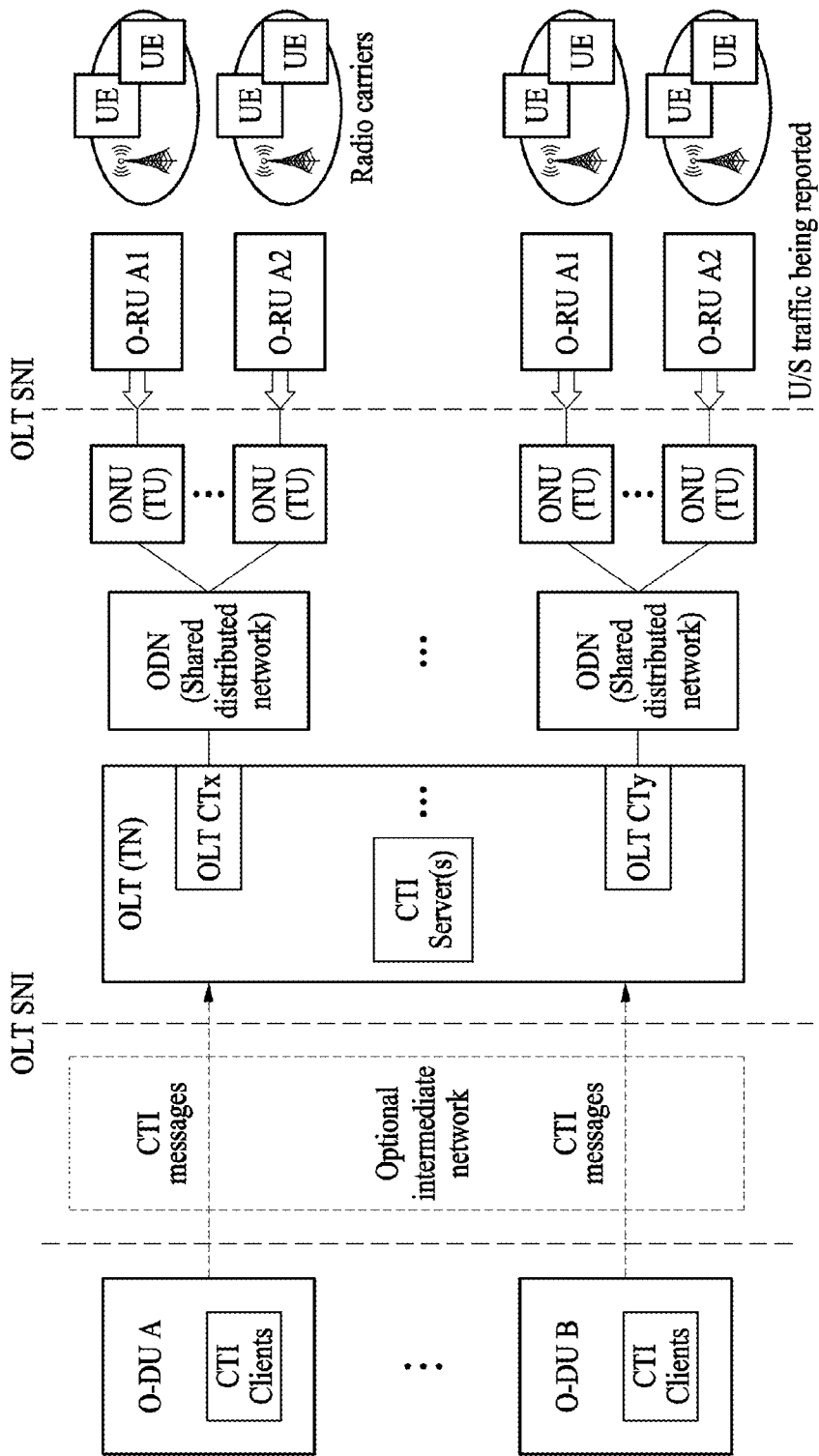
FIG. 3 is a diagram illustrating transmission of a CTI message according to an example embodiment.

FIG. 3 is a diagram illustrating transmission of a CTI message according to an example embodiment.

The CO DBA may be used for transmitting mobile fronthaul traffic between distributed unit (DU) and radio unit (RU) through the PON. The DU operates as a station equipment reporting on the bandwidth requirement of the RU (child equipment) corresponding to the DU. Since the OLT does not have visibility or extend-ability per UE (user equipment) to do so, the traffic requirement of the RU may be aggregated for all user equipments (UEs) below the RU.

As shown in FIG. 3, an open distributed unit (O-DU) may be executed independently or may be combined with an open central unit (O-CU). The OLT operates as a transport node (TN), and the ONU operates as a transport unit (TU).

a) The O-DU may allocate radio resources to the UE of an open radio unit (O-RU) connected in each mobile slot. Allocation of radio resources proceeds according to the UE's request for a time interval of the future. The O-DU may infer the corresponding fronthaul traffic per the O-RU in advance, and report the inferred future bandwidth requirements to the OLT. The report transmitted to the OLT is transmitted regularly to reflect changes in traffic.

b) The protocol used to transmit the report from the O-DU to the OLT is the CTI. The CTI protocol is bidirectional. In other words, the OLT may periodically receive a message from the O-DU, and may transmit a specific CTI message to the O-DU.

c) The mobile network is synchronized with respect to time and frequency. The OLT needs to access to the identical time of day reference to interpret a timestamp of the CTI report.

The O-RU and the ONU do not participate in CTI messaging.

Figure 4:
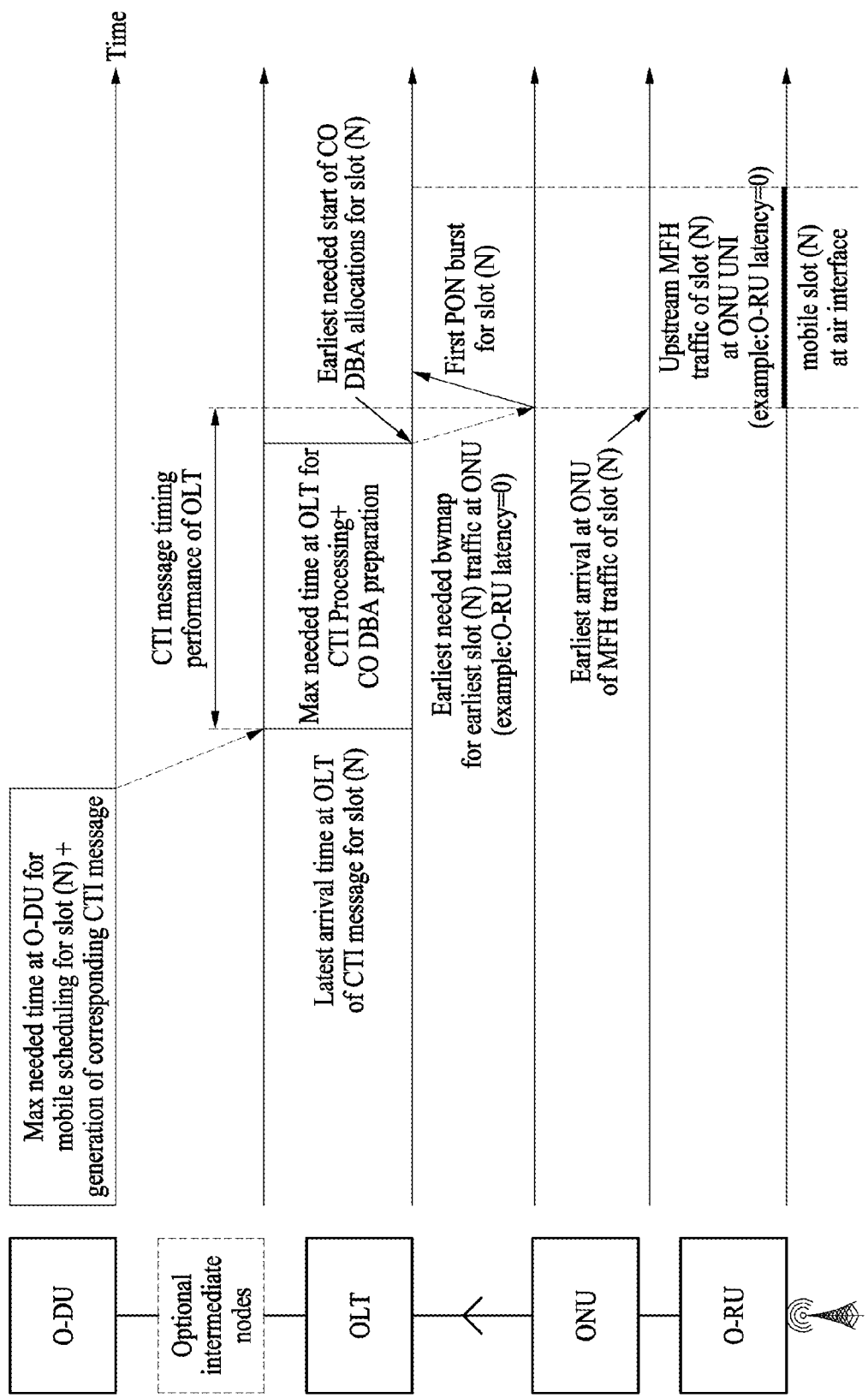
FIG. 4 is a diagram illustrating timing performance of a message transmitted by an OLT according to an example embodiment.

FIG. 4 is a diagram illustrating timing performance of a message transmitted by the OLT according to an example embodiment.

The OLT may transmit a CTI message to a plurality of O-DUs or may receive a message from the O-DUs (in other words, the CTI interface for the CTI message is bidirectional).

The CTI message may be transmitted through Ethernet and may optionally be transmitted through user datagram protocol (UDP)/internet protocol (IP). An access node of the PON supports the transmission of CTI message through Ethernet (untagged, single-tagged, double-tagged). Optionally, the OLT may support transmitting the CTI message through UDP/IP (IPv4 or IPv6) through Ethernet.

The OLT and the O-DU may prevent fragmentation of a single CTI message in an Ethernet frame. If the message is too large for the frame, a content of the message may be divided into multiple messages, each using one frame.

The CTI may include a built-in message to initiate and monitor the connection state between the CTI server and the CTI client. To this end, each CTI interaction between the CTI server of the OLT and the CTI client of the O-DU may establish a initiation according to the state diagram for message exchange (by exchanging a beacon/beacon acknowledge message), and monitor connection initiation, execution (exchanging the keep-alive message) and connection interruption (monitoring for the absence of the keep-alive message).

The OLT may apply a time-out and a keep-alive timer to the process. For the method of configuring CTI messaging in the connection relationship between the OLT and the O-DU, the OLT may have performance preferences as follows.

rate performance of the CTI message (maximum rate at which the CTI message can be accepted). The OLT may also support a rate lower than the maximum rate.

the timing performance of the CTI message (minimum time required between receiving the CTI message and the initiation of the corresponding reported time interval).

The OLT may support a configurable CTI rate (less than or equal to the maximum rate supported by the OLT) based on the traffic latency requirement and the capability of the O-DU.

Figure 5:
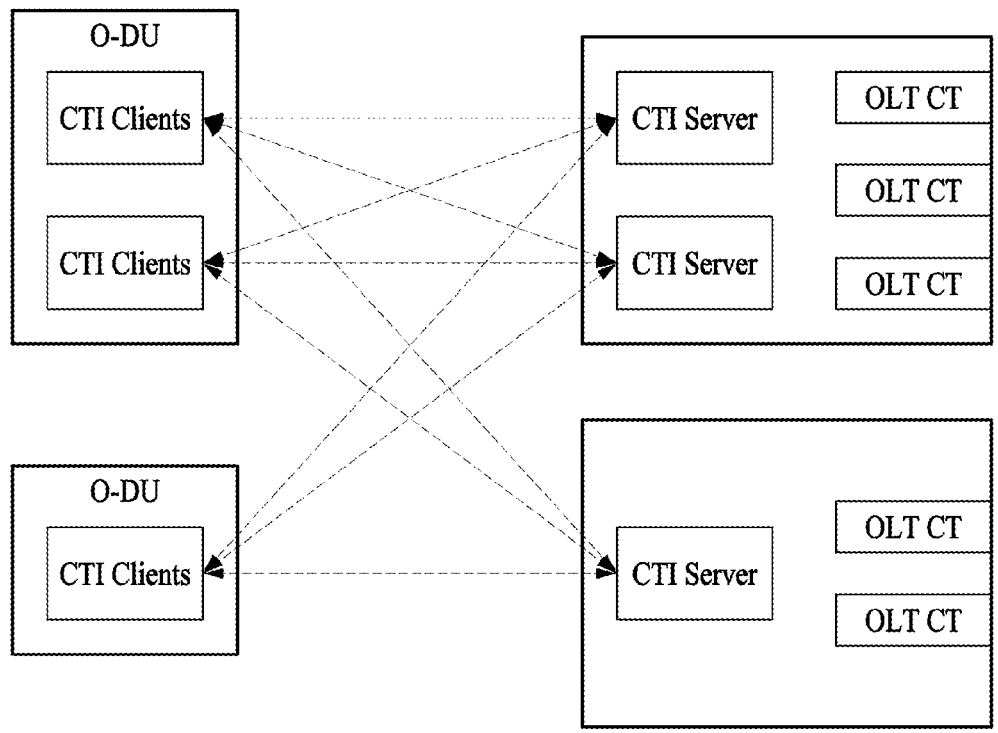
FIG. 5 is a diagram illustrating a connection relationship between a CTI client and a CTI server according to an example embodiment.

FIG. 5 is a diagram illustrating a connection relationship between a CTI client and a CTI server according to an example embodiment.

Referring to FIG. 5, the O-DU may include at least one CTI client. And, the OLT may include at least one CTI server.

Based on the aggregation of the O-RU for a plurality of ONUs, a plurality of PONs, and a plurality of OLTs, the interconnection between the CTI client and the CTI server may form an N:M mesh.

One or a plurality of CTI servers may exist for each OLT, and each of the CTI servers may communicate with the plurality of CTI clients. And, one or a plurality of CTI clients may exist for each O-DU. Each of the CTI client may communicate with a plurality of CTI servers to transmit a report.

The OLT may interpret the CTI message received from the CTI client. The CTI message may be divided into two types. One is a message for exchanging a signaling type as a CTI signaling message. The other is a message for transmitting a report on upstream traffic as a CTI report message.

The CTI signaling message may be used for initiating CTI communication between the CTI client and the CTI server and identifying the connection. In addition, the CTI signaling message is used to transmit traffic reports and other information.

Initiation of CTI communication refers to transmitting a beacon message and a beacon identification message at the starting point of the CTI interaction between the CTI client and the CTI servers. Further, identifying the connection of CTI communication refers to transmitting a keep-alive message in both directions at a reduced speed between the CTI server and the CTI client.

The CTI signaling message may include the following.
(i) correlation ID, (ii) message type, and (iii) message payload The CTI report message is used to notify the OLT about the traffic requirement of the mobile front haul.

The CTI report message may include the following.
(i) Correlation ID (called CTI Session ID). The correlation ID is for associating the traffic report with the O-RU generating the traffic and corresponds to the UNI.
(ii) Flow ID
(iii) Time interval
(iv) An indication of traffic volume at a given time interval
(v) Details of the traffic pattern through CTI pattern ID within the time interval (to account for the division of bytes within the mobile slot)

Each CTI report message refers to a single CTI session ID. The CTI Session ID is unique per the CTI report message, but may be different for each message. Therefore, different CTI report messages between the same CTI client and the same CTI server may refer to different ONU UNI at different OLT channel ends.

Each CTI report message may include a plurality of traffic reports.

Each CTI traffic report may refer to a given time interval and a optionally given flow.

Uniqueness of ID and multi-instance support are as follows:

Each ONU may have one or a plurality of UNIs.
UNI of ONU may transmit the fronthaul traffic.
Each CTI session ID corresponds to the ONU (or, ONU UNI), and the CTI session ID is unique.
Each ONU UNI may transmit a different class of service (CoS), and each CoS has a unique flow ID (the flow ID is not unique and may be reused between different CTI session IDs).
a plurality of traffic reports indicating the identical CTI session ID in one CTI report message may exist.

For each given traffic flow (i.e. per CTI session ID or optionally per CTI session ID+flow ID combination), mobile traffic has limit to a latency between O-DU and O-RU, and this latency limit is predetermined. This latency limit may be known in the OLT by the buffering and timing capabilities of the O-RU and O-DU nodes. Latency is a fixed value and is not transmitted to the CTI message.

Intermediate nodes between the O-DU and the OLT may cause latency and spend some of the latency limit. The value configured in the OLT needs to reflect the remaining latency budget in the PON system between the ONU UNI and the OLT SNI. In other words, the value in which the latency caused by the intermediate node is excluded from the latency limit needs to be reflected.

When using the CO DBA, the OLT may generate a BWmap (bandwidth allocation) as a capability of the absolute time of a specific date. The BWmap is generated to consider the CTI report information of the corresponding T-CONT, provide sufficient bandwidth for the T-CONT, and designate the time of bandwidth allocation as a capability of the time interval reported by the CTI.

Figure 6:
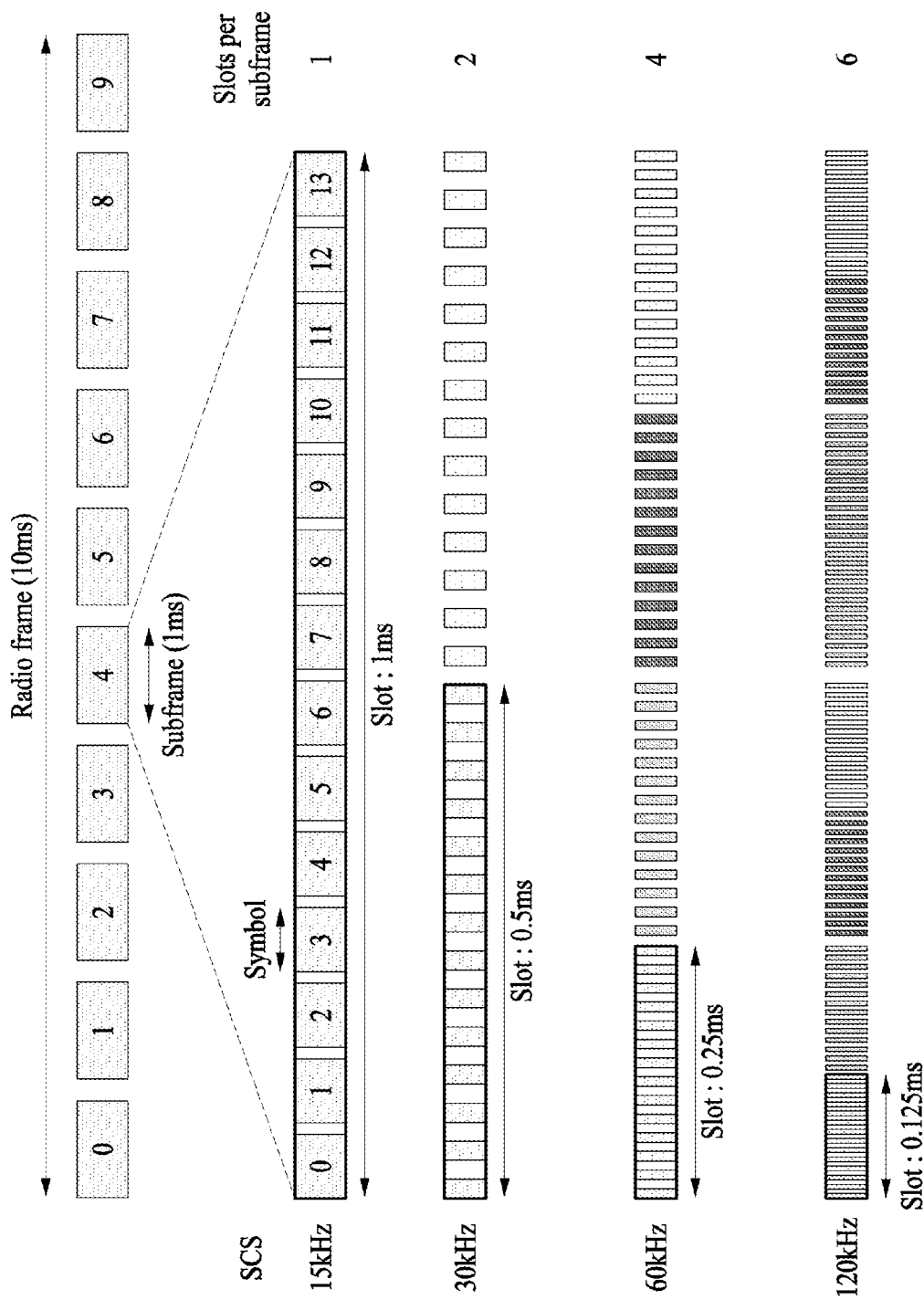
FIG. 6 is a diagram illustrating a time structure in a RAN according to an example embodiment.

FIG. 6 is a diagram illustrating a time structure in a RAN according to an example embodiment.

FIG. 6 presents for time alignment between the PON and the RAN. In particular, FIG. 6 describes the time structure of the RAN.

Supporting the mobile fronthaul using O-RAN CTI as an interface between the OLT and the DU is required. To reduce the upstream latency in time division multiplexing passive optical network (TDM-PON), the CO-DBA of the OLT may allocate variable bandwidth to conform the variable mobile bitrate traffic pattern. The CO DBA may be performed by notifying information on traffic from the DU to the OLT.

The OLT may apply the target bandwidth allocation for processing the traffic volume and time interval notified to the information by using the information on the traffic. Therefore, the traffic pattern is important information in the CO DBA using the CTI.

Uplink and downlink transmission of the RAN including the O-RU and the O-DU is determined according to a frame, sub-frame, and mobile slot of a radio interface. The number of the mobile slot per sub frame may vary according to radio sub carrier spacing (SCS) as shown in FIG. 6. As the sub carrier spacing increases, a length of the symbol may decrease. When the mobile network is a 5G network, resources may be scheduled in units of symbols included in the mobile slot.

For example, when considering a slot of 14 symbols with 15 kHz SCS, one sub frame may accommodate one slot. Further, in the case of 30 kHz, 60 kHz, and 120 kHz SCS, 2, 4, and 8 slots are included in one sub fame respectively.

Unlike scheduling based on sub frame of LTE, the 5G NR scheduler may allocate resources in units of slots, one mini-slot, or multiple slots in consideration of radio conditions. A mini-slot may include 2, 4, or 7 symbols instead of 14. In the mini-slot structure, mobile traffic does not wait for the initiation of a slot boundary.

Figure 7:
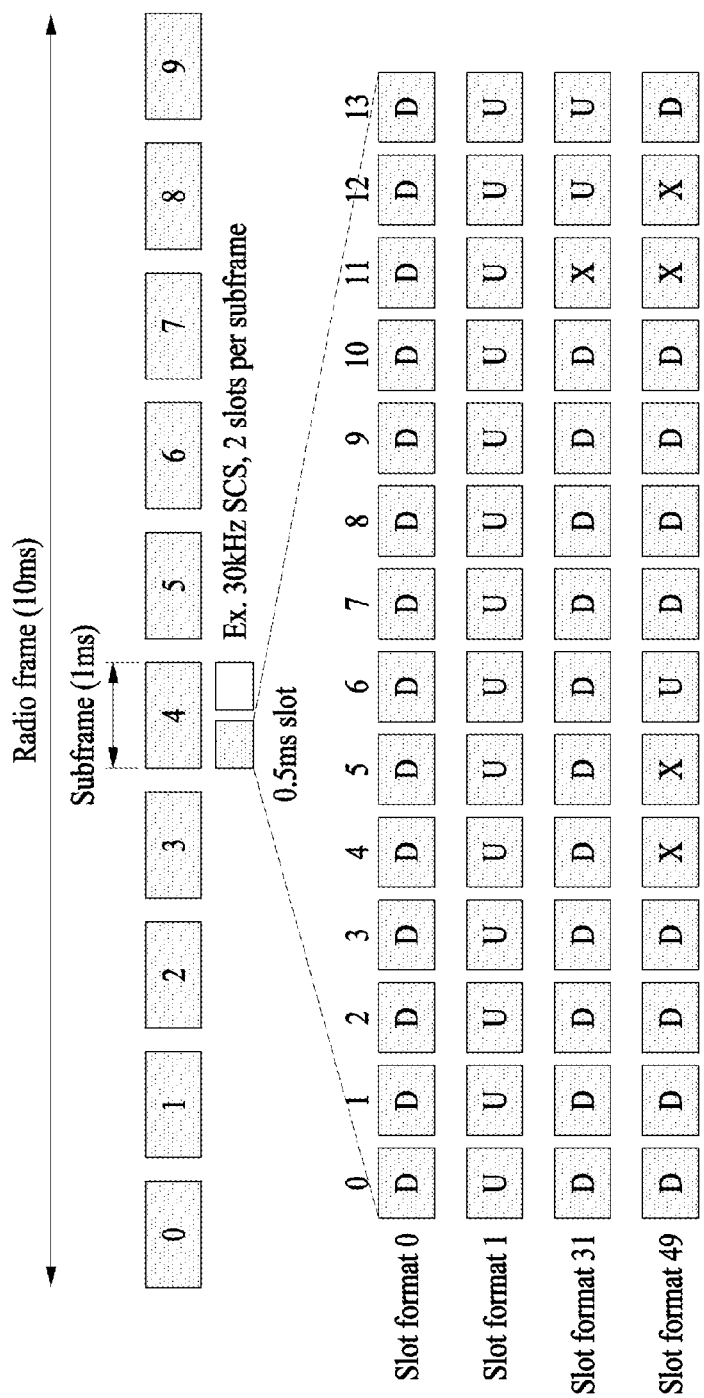
FIG. 7 is a diagram illustrating a dynamic slot configuration according to an example embodiment.

FIG. 7 is a diagram illustrating a dynamic slot configuration according to an example embodiment.

As shown in FIG. 7, the slots may be configured flexibly and independently. In the 5G network, scheduling is performed in symbol units to support a low-delay service in time division duplex (TDD).

Slot format indicator (SFI) may transmit an index for the SFI table that includes 57 possible traffic components in a combination of downlink (DL)/uplink (UL)/X (guard: flexible) symbols with up to two switching points in all symbols of downlink or uplink. A reference to a traffic pattern configured according to a combination of symbols may be exchanged from the O-DU to the OLT through the CTI message (using the CTI pattern ID). In other words, the traffic pattern predetermined differently according to the combination of symbols may be identified by the CTI pattern ID in the 5G network. The traffic pattern including a combination of different symbols may be set according to the number of the slot format. The CTI pattern ID may be included in the CTI report message transmitted between the OLT and the DU.

The boundaries of these time slots are aligned across the entire RAN. In other words, all O-RUs generate a time structure in the radio interface and simultaneously process data for the identical mobile slot. However, due to the existence of processing time between O-RUs, the timing of upstream fronthaul traffic may be different. For the O-RU of the identical category, the difference in the timing of the traffic is as small as 10 µs.

The scheduler of the O-DU may generate the CTI report related to a given time interval for the given O-RU by including the initiation and end times of the time interval. The time interval may be applied to a mobile slot or multiple mobile slots. Multiple reports on different mobile slots may also be included in one CTI message. Each mobile slot may be reported at different time intervals, and one CTI message may include a plurality of such reports.

Upstream scheduling in the PON needs to be aligned as far as possible to the time interval described in FIG. 6 and FIG. 7 to reduce buffering (and waiting time) in the ONU. The OLT and the RAN share a common time reference. This time accuracy already satisfies a very high level for phase synchronization of the O-RU through the PON. The accuracy of the initiation/end timestamps included in the CTI message is 1 μs.

The CO DBA convert the load balancing which is necessary over a time interval into a series of bursts. Latency in PON transmission may vary depending on the choice of burst (timing, size and amount).

The reported time interval is interpreted by the CO DBA to generate updates to the contents of the BWmap that match the time interval. The update period of Bwmap may be the CO DBA period. This means that the boundary of the CO DBA period should match the boundary of the expected mobile slot reflected in the fronthaul traffic. The better the time alignment described above, the smaller the latency may be.

The CO DBA may determine the size and repetition of the burst in each cycle. In an ideal case, each change in the fronthaul traffic may be captured by the reported time interval and the corresponding CO DBA period. When the change in the fronthaul traffic is too fast (when the CO DBA period time is larger than the reported time interval, in other words, when a short slot or mini-slot is used in the RAN), the O-DU may group a plurality of time intervals in one CTI message. The OLT may update all CO DBA periods to accommodate the sum of traffic over a plurality time intervals.

The CO DBAs may track changes in the fronthaul traffic as accurately as possible. Factors that cause inaccuracies in the alignment of the PON with respect to the RAN(the fronthaul traffic) time structure, such as the change of processing time in the O-RU and very high rates of traffic change(mini slot) may exist. Selecting an appropriate burst grant structure may be required in the CO DBA to meet the required waiting time while maintaining bandwidth efficiency.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A bandwidth allocation method performed by an optical line terminal (OLT) comprising:
    receiving a cooperative transport interface (CTI) message including a traffic pattern corresponding to a CTI pattern identification (ID) from a distributed unit (DU) of a mobile network; and
    allocating a bandwidth for transmitting mobile data based on a symbol included in the traffic pattern included in the CTI message,
    wherein the traffic pattern is identified through a slot format indicator table comprising a plurality of traffic components comprising at least one of an uplink symbol, a downlink symbol, and a flexible symbol.

2. The bandwidth allocation method of claim 1, wherein, in the traffic pattern, at least one of the uplink symbol, the downlink symbol, or the flexible symbol is disposed in a time slot of a predetermined length for each of a plurality of sub frames included in a radio frame.

3. The bandwidth allocation method of claim 1, wherein a length of a slot included in a sub frame is determined differently according to subcarrier spacing.

4. The bandwidth allocation method of claim 1, wherein the number of slots included in a sub frame is determined differently according to subcarrier spacing.

5. The bandwidth allocation method of claim 1, wherein:
    a boundary of a time slot of the traffic pattern is aligned in a radio access network (RAN), and
    radio units (RUs) of the RAN process data during the same time slot at the same time.

6. The bandwidth allocation method of claim 1, wherein:
    the DU is configured to generate a CTI report at a specific time interval for a RU, and
    the specific time interval corresponds to one or a plurality of time slots.

7. A bandwidth allocation method performed by an optical line terminal (OLT) comprising:
    receiving a cooperative transport interface (CTI) message including a traffic pattern from a distributed unit (DU) of a mobile network; and
    allocating a bandwidth for transmitting mobile data based on a symbol of a traffic pattern included in the CTI message,
    wherein the traffic pattern is identified through a slot format indicator table comprising a plurality of traffic components comprising at least one of an uplink symbol, a downlink symbol, and a flexible symbol.

8. An optical line terminal (OLT) for allocating a bandwidth, the OLT comprising:
    a processor,
    wherein the processor is configured to:
    receive a cooperative transport interface (CTI) message including a traffic pattern corresponding to a CTI pattern identification (ID) from a distributed unit (DU) of a mobile network, and allocate a bandwidth for transmitting mobile data based on a symbol included in the traffic pattern included in the CTI message,
    wherein the traffic pattern is identified through a slot format indicator table comprising a plurality of traffic components comprising at least one of an uplink symbol, a downlink symbol, and a flexible symbol.

9. The OLT of claim 8, wherein, in the traffic pattern, at least one of the uplink symbol, the downlink symbol, or the flexible symbol is disposed in a time slot of a predetermined length for each of a plurality of sub frames included in a radio frame.

10. The OLT of claim 8, wherein a length of a slot included in a sub frame is determined differently according to subcarrier spacing.

11. The OLT of claim 8, wherein the number of slots included in a sub frame is determined differently according to subcarrier spacing.

12. The OLT of claim 8, wherein:
    a boundary of a time slot of the traffic pattern is aligned in a radio access network (RAN), and
    radio units (RUs) of the RAN process data during the same time slot at the same time.

13. The OLT of claim 8, wherein:
    the DU is configured to generate a CTI report at a specific time interval for a RU, and
    the specific time interval corresponds to one or a plurality of time slots.

* * * * *